US007805977B2

(12) United States Patent
Study

(10) Patent No.: US 7,805,977 B2
(45) Date of Patent: Oct. 5, 2010

(54) SYSTEM AND METHOD FOR MEASURING FORCE IN A BARRIER OPERATOR SYSTEM

(75) Inventor: Robert Study, Arlington Heights, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 133 days.

(21) Appl. No.: 11/510,881

(22) Filed: Aug. 28, 2006

(65) Prior Publication Data

US 2008/0047321 A1 Feb. 28, 2008

(51) Int. Cl.
*G01P 15/00* (2006.01)

(52) U.S. Cl. .................................................... 73/12.01

(58) Field of Classification Search ................ 73/12.01; 318/280, 434

See application file for complete search history.

(56) References Cited

U.S. PATENT DOCUMENTS

| | | | | |
|---|---|---|---|---|
| 5,056,847 | A * | 10/1991 | Stillwell et al. | 296/50 |
| 5,929,580 | A | 7/1999 | Mullet et al. | |
| 6,111,374 | A | 8/2000 | Fitzgibbon et al. | |
| 6,696,806 | B2 * | 2/2004 | Study et al. | 318/280 |
| 6,897,630 | B2 * | 5/2005 | Murray et al. | 318/434 |
| 7,019,478 | B2 * | 3/2006 | Gregori et al. | 318/282 |
| 7,034,486 | B1 | 4/2006 | McMahon | |
| 7,057,547 | B2 * | 6/2006 | Olmsted et al. | 341/176 |
| 7,119,509 | B1 * | 10/2006 | Keller et al. | 318/286 |
| 7,154,377 | B2 * | 12/2006 | Gregori | 340/5.7 |
| 2003/0193304 | A1 | 10/2003 | Fitzgibbon | |
| 2004/0124801 | A1 | 7/2004 | Jurado et al. | |
| 2005/0285553 | A1 | 12/2005 | Gregori et al. | |
| 2009/0122534 | A1 * | 5/2009 | Olmsted | 362/233 |

FOREIGN PATENT DOCUMENTS

| | | |
|---|---|---|
| EP | 1304442 | 4/2003 |
| EP | 1580861 | 9/2005 |
| GB | 2426788 | 12/2006 |

OTHER PUBLICATIONS

British Search Report Under Section 17 dated Dec. 19, 2007 relative to British Patent Application No. GB0715756.3.

* cited by examiner

*Primary Examiner*—Lisa M Caputo
*Assistant Examiner*—Octavia Davis
(74) *Attorney, Agent, or Firm*—Fitch Even Tabin & Flannery

(57) ABSTRACT

An impact force measurement associated with a test of a moveable barrier operator is obtained. An impact force signal representing the impact force measurement is generated. The impact force signal is received at a controller. Based upon the impact force represented by the signal, an adjustment of the at least one performance parameter of the moveable barrier operator is determined. The at least one parameter is then adjusted by the controller. A secondary protection device may thereafter be added as appropriate.

16 Claims, 2 Drawing Sheets

SYSTEM AND METHOD FOR MEASURING FORCE IN A BARRIER OPERATOR SYSTEM

FIELD OF THE INVENTION

The field of the invention relates to barrier operator systems and, more specifically, to impact force measurements that are made using these systems.

BACKGROUND

Different types of moveable barrier operators have been sold over the years and these systems have been used to actuate various types of moveable barriers. For example, garage door operators have been used to move garage doors and gate operators have been used to open and close gates.

Such barrier movement operators may include various mechanisms to open and close the barrier. For instance, a wall control unit may be coupled to the barrier movement operator and sends signals to a head unit thereby causing the head unit to open and close the barrier. In addition, operators often include a receiver unit at the head unit to receive wireless transmissions from a hand-held code transmitter or from a keypad transmitter, which may be affixed to the outside of the area closed by the barrier or other structure.

In some countries, for instance, in Europe, agency standards require that the impact force associated with a barrier in a barrier operator system be measured. If the impact force is greater than a threshold value, some jurisdictions require that a secondary protection device (e.g., a photo beam detector) be installed as part of the operator system.

Typically, a measurement tool is used to perform the actual impact force measurements. In one example, a human installer reads the peak impact force measurement on a display of the measurement device and decides whether the value indicates the need for a secondary protection device. If the installer determines that a secondary safety device is needed, then the installer or some other party may install the device in order to conform to the safety standards.

Unfortunately, these previous systems are error prone due to the manual involvement of the installer. For instance, the installer must use their judgment as to whether a secondary safety device is required. If the installer makes a mistake, a secondary safety device may be erroneously installed when unneeded or not installed when needed creating an installation that does not meet agency requirements.

SUMMARY

Approaches are provided that allow the automatic communication of impact force measurement information to an operator system that can alter operating parameters of the system and/or utilize the information to determine whether a secondary safety device should be used in the system. The approaches described herein are easy to use, cost effective, and accurate, thereby eliminating or substantially reducing installer mistakes when determining whether to install secondary safety devices or adjust system parameters.

In many of these embodiments, an impact force measurement associated with a test of a moveable barrier operator is obtained and an impact force signal representing the impact force measurement is generated. The impact force signal is received at a controller. Based upon the impact force represented by the signal, an adjustment of at least one performance parameter of the moveable barrier operator is determined. The parameter or parameters are then adjusted by the controller. A secondary protection device may thereafter be added as needed, for instance, if the impact force exceeds a threshold.

To obtain the impact force measurement, the impact force may be read from a measurement device via a wired interface. After obtaining the impact force measurement, the measurement device may be disconnected without affecting the operation of the operator.

In another example, the impact force measurement may be obtained from a measurement device via a radio frequency (RF) interface. As with the wired interface, after obtaining the impact force measurement, the measurement device may be disconnected without affecting the operation of the operator.

Thus, approaches are provided that allow the automatic communication of impact force measurement information to an operator system that can thereafter utilize the information to adjust operating parameters of the system and/to determine whether a secondary safety device should be installed in the system. The approaches described herein are easy to use, cost effective, and accurate, thereby eliminating or substantially reducing installer mistakes when determining whether to install secondary safety devices or adjust system parameters.

Skilled artisans will appreciate that elements in the figures are illustrated for ease of understanding and have not necessarily been drawn to scale. For example, the dimensions of some of the elements in the figures may be exaggerated relative to other elements to help to improve understanding of various embodiments of the present invention. Also, common but well-understood elements that are useful in a commercially feasible embodiment are often not depicted in order to facilitate a less obstructed view of the various embodiments of the present invention.

DESCRIPTION

Figure 1:
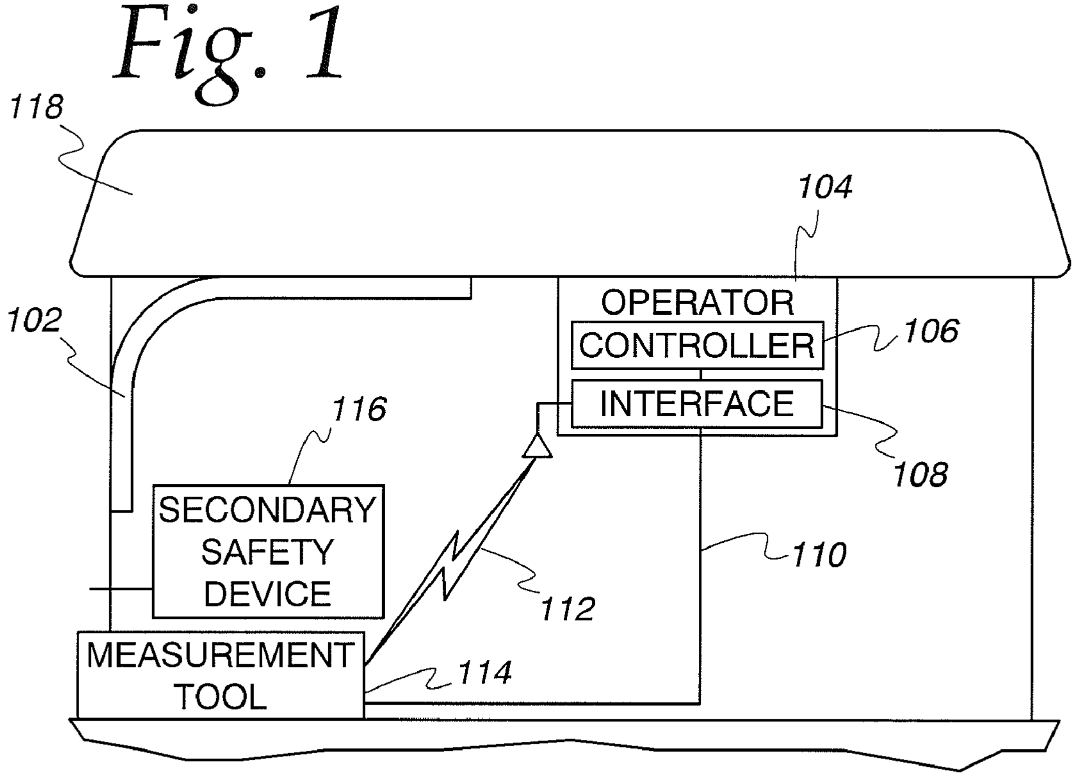
FIG. 1 is a block diagram of a system for adjusting performance parameters of a moveable barrier operator system according to the present invention.

Referring now to the drawings and especially FIG. 1, a system for adjusting the performance parameters of a moveable barrier operator system is described. A barrier operator 104 is positioned within a garage 118 and moves a barrier 102. Although in this example, the barrier 102 is a garage door and the barrier operator 104 is a garage door operator, it will be realized that the barrier may be any type of barrier (e.g., garage door, swinging door, swinging gate) and the barrier operator may be any type of barrier operator (e.g., garage door operator, gate operator). In addition, the garage 118 may be any type of structure or protected area.

The operator 104 comprises a controller 106 and an interface 108. The interface 108 receives signals from various sources. For instance, the interface 108 receives radio frequency (RF) signals 112 from a measurement tool 114. Alternatively or in addition to the RF signals 112, the interface 108 may receive signals via a wired connection 110 (e.g., a cable or wire).

The measurement tool 114 is a device that measures the impact force of the barrier 102. In this regard, the measurement tool 114 may use any type of mechanism (e.g., any type of sensing mechanism) that receives and measures the impact force. Once measured, the impact force measurement is communicated to the operator 104 by either or both of the connections 110 or 112.

A secondary safety device 116 may be installed as a result of the measurements made by the measurement tool 114. The secondary safety device 116 may be any type of safety device that determines whether obstructions exist in the pathway of the door. For instance, the secondary safety device may be a IR detector.

In one example of the operation of the system of FIG. 1, an impact force measurement associated with a test of a moveable barrier operator 104 is obtained. An impact force signal representing the impact force measurement is generated in the tool 114. The impact force signal is received at the controller 106 via the interface 108. Based upon the impact force represented by the signal, an adjustment of one or more performance parameters of the moveable barrier operator 104 is determined. The one or more performance parameters are then adjusted to conform to the decision made by the controller 106.

Various types of adjustments may be made to the operator 104. For example, if the impact force exceeds a threshold, the secondary safety device 116 may be required to be used. In another example, if the force has exceeded a threshold, the operator may lower the force setting. In yet another example, the rate of rise of the force may be determined, and if the rate of rise of the force is too high, the speed setting of the operator may be lowered. In still another example, the operator may inform the installer of the nature and extent of any corrective action, for instance, by presenting a message on a display for the user or installer to see.

Figure 2:
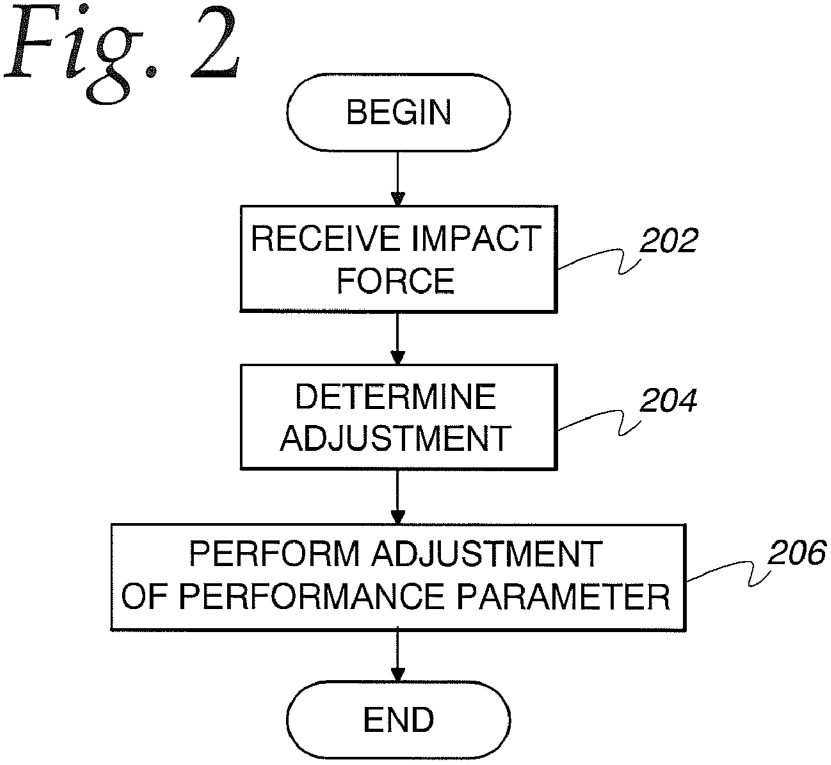
FIG. 2 is a flowchart of an approach for adjusting performance parameters of a moveable barrier operator system according to the present invention.

Referring now to FIG. 2, one approach for adjusting the operating parameters of a moveable barrier operator is described. At step 202, an impact force value is received. For example, the impact force may be received via a wireless link from a measurement device. In another example, the impact force may be received via a wired link (e.g. a cable) from the measurement device.

At step 204, an adjustment for the parameters of the moveable barrier operator is determined. For example, if the impact force exceeds a threshold, the use of a secondary safety device may be required. In another example, the rate of rise of the force may be determined, and if the rate of rise is too high, the operator may lower the speed. In still another example, if the force has exceeded a threshold, the operator may lower the force setting of the operator.

At step 206, the adjustment determined at step 204 is applied to the operator. For example, if an adjustment of the speed or force profiles is determined at step 204, then that adjustment is made at step 204.

Figure 3:
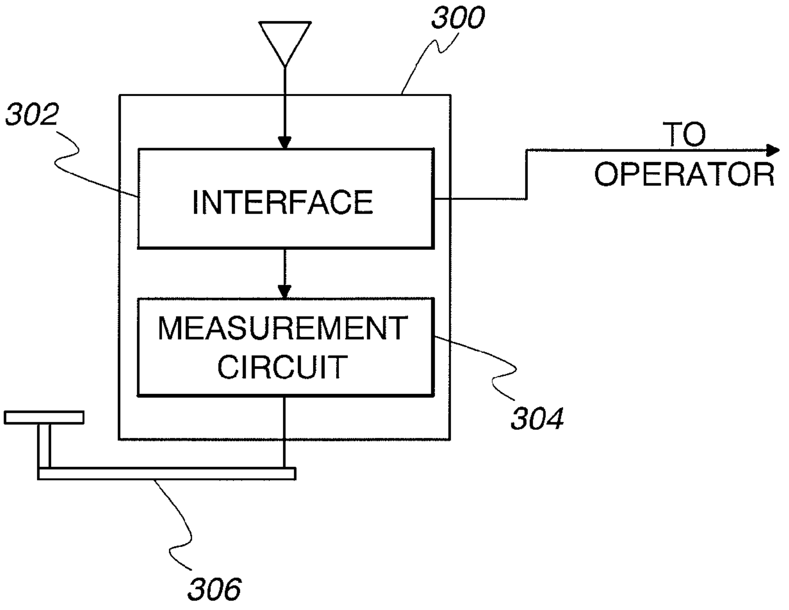
FIG. 3 is a block diagram of a measurement device used to determine an impact force measurement that is used to adjust performance parameters of a moveable barrier operator system according to the present invention.

Referring now to FIG. 3, one example of a measurement tool is described. In this example, the measurement tool 300 includes an interface 302 and a measurement circuit 304.

The measurement circuit 304 measures the impact force associated with an object in a pathway of the measurement tool. For example, an installer may place the tool 300 in the pathway of the door or other barrier and the impact force associated with the door may be measured.

The measurement circuit 304 includes appropriate electrical and/or mechanical components that are configured to receive a mechanical force and convert this received mechanical impact force into an electrical signal that is representative of the force.

The interface 302 receives the electrical signal representing the impact force measurement and (if needed) converts the signal into an appropriate form or format for transmission to a barrier operator. For example, the electrical signal received from the measurement circuit 304 may be converted into an RF signal for transmission to the operator. In another example, the electrical signal received from the measurement circuit 304 may be converted into a signal having appropriate voltage and/or current characteristics for transmission to the operator. In another example, the electrical signal received from the measurement circuit 304 may already be in the appropriate voltage and current form or format, so the interface 302 simply forwards the signal to the operator over a wire.

Figure 4:
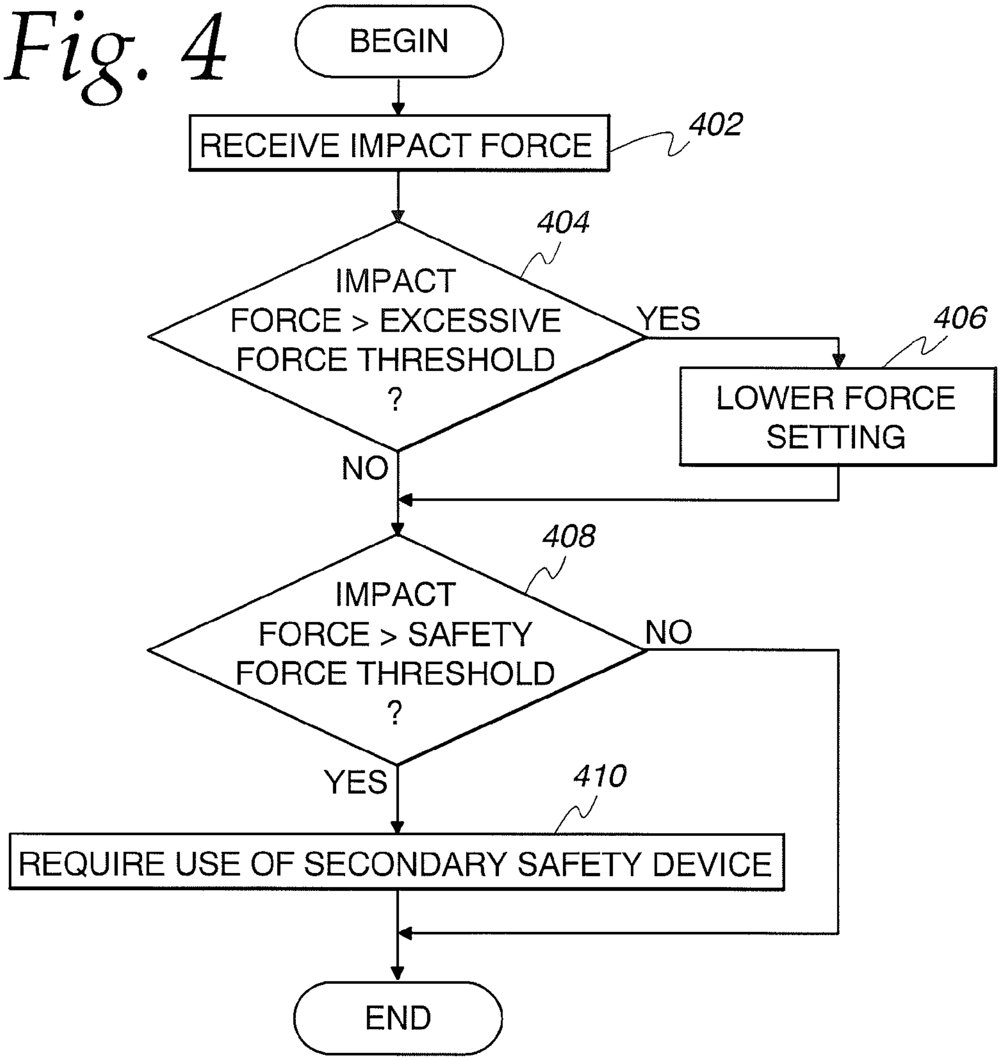
FIG. 4 is a flowchart of one approach for determining the adjustment of parameters according to the present invention.

Referring now to FIG. 4, one example of determining the parameters to adjust in a moveable barrier operator is described. It will be appreciated that this is one example of an approach that can be used to adjust certain parameters used in the operator and that other approaches may also be used to adjust other parameters or characteristics.

At step 402, the impact force is received from the measurement device and a compared to an excessive force threshold at step 404. If the excessive force threshold is exceeded, at step 406, the operator automatically lowers the force setting of the operator. Execution then continues at step 408.

At step 406, the impact force is compared to a safety force threshold. If the force measured exceeds the safety force threshold, the operator may require the use of a secondary safety device (e.g., an IR beam device) at step 410 until the force value is measured to be less than the safety force threshold. The values of the excessive force threshold and the safety force threshold may be the same or different depending upon the system and the needs of the user.

While there has been illustrated and described particular embodiments of the present invention, it will be appreciated that numerous changes and modifications will occur to those skilled in the art, and it is intended in the appended claims to cover all those changes and modifications which fall within the true scope of the present invention.

What is claimed is:

1. A method for automatically adjusting the performance parameters of a moveable barrier operator that is coupled to a movable barrier, the method comprising:

temporarily coupling a portable measurement device to the movable barrier operator;

placing the portable measurement device in the pathway of the movable barrier to allow contact between the movable barrier and the portable measurement device when the barrier is moved;

moving the movable barrier and contacting the portable measurement device with the movable barrier;

obtaining an impact force measurement directly representative of force of the movable barrier against the portable measurement device, the impact force measurement being associated with a test of a moveable barrier operator;

at the portable measurement device, generating an impact force signal representing the impact force measurement and transmitting the impact force signal to the movable barrier operator;

receiving the impact force signal at a controller of the movable barrier operator;

based upon the impact force represented by the signal, determining an adjustment of the at least one performance parameter of the moveable barrier operator;

adjusting the at least one parameter by the controller; and removing the portable measurement device from the pathway of the movable barrier.

2. The method of claim 1 comprising selectively adding a secondary protection device.

3. The method of claim 1 wherein transmitting the impact force signal occurs via a wired interface.

4. The method of claim 3 further comprising after transmitting the impact force signal, disconnecting the portable measurement device from the movable barrier operator without affecting the operation of the operator.

5. The method of claim 1 wherein transmitting the impact force signal via a radio frequency (RF) interface.

6. The method of claim 5 further comprising after transmitting the impact force signal, disconnecting the portable measurement device from the movable barrier operator without affecting the operation of the operator.

7. The method of claim 1 wherein determining an adjustment the at least one performance parameter comprises determining an adjustment of the at least one performance parameter based upon a comparison of the impact force with a threshold.

8. The method of claim 7 comprising dynamically adjusting the threshold.

9. A moveable barrier operator comprising:

a port which provides a temporary connection with a portable'measurement device that is temporarily placed in the pathway of a movable barrier, the port configured to receive a measurement value from the portable measurement device directly representative of an impact force from the portable measurement device, the impact force representative of the force of the movable barrier impacting the portable measurement device; and a controller coupled to the port which receives the impact force measurement value from the portable measurement device and compares the measurement value to a threshold, and based upon the comparison, adjusts at least one performance parameter of the moveable barrier operator.

10. The moveable barrier operator of claim 9 wherein the port is wired.

11. The moveable barrier operator of claim 9 wherein the port is wireless.

12. The moveable barrier operator of claim 9 wherein the at least one performance parameter relates to and controls a speed profile of the operator.

13. The moveable barrier operator of claim 9 wherein the at least one performance parameter relates to and controls a force profile of the operator.

14. A kit configured to be coupled to a moveable barrier operator and which measures the impact force exerted by the barrier when the barrier moves from an open position to a closed position, the kit comprising:

a portable measurement device configured to be placed in the pathway of the movable barrier and have contact with the movable barrier when the barrier is moved, the portable measurement device including an interface and measuring circuit;

a coupling device which removably couples the portable measurement device to a port in the moveable barrier operator, the measuring circuit generating an impact force signal representing an impact force measurement and effecting transmission of the impact force signal from the interface to the movable barrier operator.

15. The kit of claim 14 wherein the port is wired.

16. The kit of claim 14 wherein the port is wireless.

* * * * *

UNITED STATES PATENT AND TRADEMARK OFFICE

CERTIFICATE OF CORRECTION

PATENT NO. : 7,805,977 B2
APPLICATION NO. : 11/510881
DATED : October 5, 2010
INVENTOR(S) : Study It is certified that error appears in the above-identified patent and that said Letters Patent is hereby corrected as shown below:

IN THE CLAIMS:

Column 5, Claim 5, Line 16: After “signal” insert -- occurs --; and

Column 5, Claim 9, Line 29: Change “portable’” to -- portable --.

Signed and Sealed this
Eleventh Day of January, 2011

David J. Kappos
*Director of the United States Patent and Trademark Office*